Patented July 13, 1943

2,324,063

UNITED STATES PATENT OFFICE 2,324,063

PROCESS OF PRODUCING FAT-SOLUBLE VITAMIN CONCENTRATES

Loran O. Buxton, Harrison, N. J., assignor to National Oil Products Company, Harrison, N. J., a corporation of New Jersey No Drawing. Application November 30, 1938, Serial No. 243,095

13 Claims. (Cl. 167—81)

The invention relates, in general, to the purification and concentration of fat-soluble vitamin composition and, in particular, to a process of increasing the vitamin A potency in the unsaponifiable fraction of a marine oil.

It is well known that one of the chief natural sources of the fat-soluble vitamins is the marine oils, i. e. fish and fish liver oils. The fat-soluble vitamins in the marine oils occur in the unsaponifiable fraction which is dissolved in the fatty portion of the oil. The unsaponifiable fraction may be recovered from the oil by many different processes, most of which entail the broad principle of saponifying the fatty material by means of an alkali, thus forming a soap from which the unsaponifiable fraction is extracted by means of a solvent therefor. The so-called vitamin concentrate which results from such a process contains vitamin A in its alcoholic form along with many complex organic compounds and impurities which impart an off-color and an obnoxious taste and odor to the concentrate. Various attempts have been made by research workers in this field to rid the unsaponifiable fraction of the undesirable taste, odor and color characteristics, as well as to increase the vitamin A and/or D potency thereof. While many processes have been suggested and used to a limited extent to accomplish the foregoing objects, no efficient commercial process has, as yet, been devised.

The general object of the invention is to obviate the foregoing and other disadvantages.

A specific object of the invention is to provide an improved process for the concentration and purification of the unsaponifiable fraction of marine oils which is readily adapted for commercial operations.

Another object of the invention is to provide an improved process for increasing the potency of the alcoholic form of vitamin A derived from fish and fish liver oils.

Other objects and advantages of my invention will be readily apparent and will in fact appear herein.

In the course of my experimentation I have found that the foregoing and other objects of the invention may be realized by the following process, which, briefly, comprises admixing the unsaponifiable fraction of a marine oil or a non-polar solvent solution thereof with a completely de-aerated mixture of an alkaline reactive adsorbent and a non-polar organic solvent for the unsaponifiable fraction, a solvent vapor zone being maintained immediately adjacent to the upper surface of the mix to exclude oxygen therefrom. The mixture is stirred with or without the aid of heat. The adsorbent bearing the adsorbed vitamin A in alcoholic form is separated in a wet state from the mixture and treated with a combined non-polar and a polar solvent mixture, with the quantity of the former exceeding that of the latter, to remove from the adsorbent the vitamin A adsorbed thereon. The eluted vitamin A and solvent is removed from the adsorbent material and the solvent removed from the vitamin A by distillation in the usual manner.

The invention accordingly comprises the several steps and relation of one or more of such steps with respect to each of the others thereof, which will be exemplified in the process hereinafter disclosed, and the scope of the invention will be indicated in the claims.

In carrying out the invention, any suitable alkaline reactive adsorbent for vitamin A may be employed. The adsorbent used must be substantially anhydrous and one which will not deleteriously affect the alcoholic form of vitamin A; and preferably one which is readily available commercially in a form suitable for use without further elaborate treatment. The adsorbents which I have found to have the above characteristics include, among others, barium oxide, strontium oxide, aluminum oxide, calcium oxide and magnesium oxide; and their corresponding hydroxides, as well as activated earths sometimes known as activated clays, some of which are known to the trade as bentonite and "Optimum tonsil" and which are alkaline reactive in the sense that they do not destroy vitamin A. Any one or a combination of two or more of said adsorbents may be used, and one of the features of this invention is that it is practical to use them in the state in which they are now commercially available, it being preferable to employ the aforementioned metallic oxides and/or hydroxides and particularly calcium hydroxide. Whatever adsorbent is employed, it is preferable that it be in a finely divided form so that the exposed surface thereof be great for each unit of volume or weight thereof. I have found that for the purpose of this invention, good results are obtained when the particles pass a 200-300 mesh screen.

Any suitable solvent may be used which will dissolve or serve as a vehicle for the unsaponifiable fraction during the treatment with the adsorbent. The solvent may be a non-polar organic solvent for said material, and it may be any one or a combination of two or more of the non-polar solvents of the aromatic group, such as benzene, cyclohexane, toluene, chlorobenzene and the like, and also the non-polar solvents of the aliphatic group, such as heptane, hexane, ethylene dichloride, petroleum ether and the like.

After selecting the desired alkaline reactive adsorbent and the non-polar solvent, the adsorbent is de-aerated in a manner which does not require the use of nitrogen. The de-aeration step comprises admixing the adsorbent and the non-polar solvent in either an open or a closed vessel and stirring the mixture until the last trace of air has been eliminated. The solvent which I preferably employ is one, such as ethylene dichloride, having a relatively high vapor pressure. During the stirring of the mix, which may be heated if desired, there is formed and maintained a solvent-vapor zone immediately adjacent the surface of the mix to exclude the air therefrom. This vapor zone between the mix and the atmosphere may be increased by heating the mix to an elevated temperature materially below the boiling point of the solvent; and this heating of the mix accelerates the formation of the solvent-vapor zone and also the de-aeration of the adsorbent. The quantities of adsorbent and non-polar solvent of the above mix depends on the particular procedure which is followed.

One method is to employ a quantity of non-polar solvent in the mix which is only a little greater than the quantity necessary to completely wet each and every particle of the mix. After de-aeration thereof in the manner heretofore described, the unsaponifiable fraction is dissolved in an appropriate quantity of non-polar solvent and then added to said de-aerated mix while the same has the solvent-vapor protective zone thereover. The heating is continued to maintain said protective zone and the resultant batch is continuously agitated for an extended period of time to maintain in motion said fine particles of adsorbent. Due to the continuous agitation of said batch, the large surface of the adsorbent comes in contact with a large surface of the solution containing vitamin A. During agitation of the mass the adsorbent particles selectively or preferentially adsorb the vitamin A and vitamin D if it is present while most of the impurities thereof remain dissolved in the non-polar solvent because the affinity of said solvent for said impurities is greater than the affinity of said adsorbent for said impurities.

Instead of adding but a small quantity of the non-polar solvent to the adsorbent, de-aerating the same and then adding a solution of an unsaponifiable fraction of a marine oil in a non-polar solvent to the de-aerated mix, it is within the purview of this invention to add the total quantity of non-polar solvent to be employed to the adsorbent and completely de-aerating the adsorbent by heating and stirring. Thereafter and while the solvent-vapor protective zone is maintained, the unsaponifiable fraction is added directly to the mix and the resultant batch is treated in the manner heretofore described to effect a separation of the fat-soluble vitamins from the impurities of said unsaponifiable fraction as originally coupled therewith.

Another modification which has been found particularly efficacious commercially is to add the unsaponifiable fraction of the marine oil to the non-polar solvent and stir to mix thoroughly. Add a de-aerated mixture of non-polar solvent and adsorbent, then agitate and filter. To the filtrate add a quantity of a fresh de-aerated mixture of non-polar solvent and adsorbent, agitate and filter. Combine residues and elute the vitamin A with a combination of polar and non-polar solvents.

Although the individual quantities of the non-polar solvent, the adsorbent and the unsaponifiable fraction in either of said resultant batches may vary over rather wide limits, the ratio of the unsaponifiable fraction to the non-polar solvent therefor should be at least 1 to 10 and preferably between about 4 to 10 and 6 to 10 for economical purposes; and the ratio of said unsaponifiable fraction to said adsorbent should be at least as great as 2 to 1 and preferably between about 3 to 1 and 5 to 1 for economical commercial purposes.

After the resultant batch has been agitated by stirring or the like while the vapor-solvent zone has been maintained thereover for a length of time sufficient for the adsorption of practically all the vitamin A and vitamin D when present, the adsorbent is separated therefrom in a wet state by filtering, settling and decanting or by centrifuging. The adsorbent is preferably in the wet state in order to provide a protective layer of the non-polar solvent and a vapor layer thereof around the adsorbent to prevent the air from coming into contact with the vitamin A. Although a good portion of the impurities, and especially those which are obnoxious, is separated from the vitamin A in the adsorption step, some impurities as well as the vitamin A material are adsorbed by the adsorbent in said step.

Now, the wet absorbent is eluted with an appropriate agent therefor. I have found that if only a non-polar solvent is used for this elution step a great many washings are required to remove the vitamins from the adsorbent and that most of the adsorbed impurities as well as the vitamins also go into solution; and if only a polar solvent is employed, a lesser number of washings can be employed to remove the vitamins from the adsorbent, but in this case also the impurities are also dissolved therefrom. The desorbing or eluting solvent, which is commercially highly satisfactory because of the relatively small numbers of washings required and because the adsorbed impurities on the absorbent will remain thereon, is a combination of a non-polar solvent and a polar solvent for said fat-soluble vitamins. The ratio of said non-polar solvent to said polar solvent should be greater than 5 to 1 and preferably between 10 to 1 and 100 to 1. By subjecting the wet absorbent to about between 5 to 10 washes of the combined polar and non-polar solvents, practically all the vitamins, free from some of the impurities thereof adsorbed on the adsorbent, is selectively dissolved by said solvents. Some of the polar solvents which may be employed are ethanol, methanol, isopropanol, acetone and dioxane. The thus purified vitamin concentrate may be recovered from the solvent by distilling off the latter in an inert atmosphere.

The present invention is essentially concerned with the concentration and purification of the unsaponifiable fraction of fat-soluble vitamin-containing marine oils, rich in vitamin A and/or D, such as the liver oils obtained from swordfish, pollack, ling cod, jewfish, dogfish and other fish, as well as the oils obtained from the bodies of these and other fish. In one of its more specific aspects it is especially concerned with the concentration and purification of the vitamin A in those fish liver oils rich in vitamin A and derived in part from the specific fish hereinbefore specifically mentioned. The expression "marine oil" is used herein to connote the oils obtained from the bodies and livers of fish which normally contain vitamins A and/or D.

When either a fish liver oil or fish oil rich in vitamin A is to be concentrated and purified, the unsaponifiable fraction thereof is added to a completely de-aerated and preferably heated mixture of a non-polar solvent therefor and an alkaline reactive adsorbent. This batch is stirred for an extended period of time during which the vapor-solvent zone is maintained thereabove. Most of the vitamin A together with the vitamin D present now has been adsorbed from the solution, and the adsorbent is removed in a wet state from the liquid of said batch and then washed a number of times with a combined non-polar solvent and polar solvent to elute substantially only vitamin A together with vitamin D. The solvent is then distilled off leaving vitamin A together with vitamin D free from obnoxious odor and taste.

For a fuller understanding of the nature and objects of the invention, reference should be had to the following examples which are given merely to illustrate further the invention and are not to be construed in a limiting sense, all parts herein being given by weight.

Example I

Place into an open vessel 50 parts of aluminum oxide and 400 parts of heptane. Stir moderately for about 5 to 10 minutes to completely de-aerate the mix. Add 100 parts of the unsaponifiable fraction of swordfish liver oil (900,000 International units of vitamin A per gram), continuing the stirring for 30 to 60 minutes and then filter. Elute the wet adsorbent 10 times with the combination consisting of 5 parts ethanol and 95 parts heptane. Remove solvent by vacuum distillation in the presence of nitrogen gas.

The vitamin concentrate is greatly improved in taste, odor and color.

Example II

Place in a vessel 50 parts of magnesium oxide and 900 parts of low boiling petroleum ether whose boiling point is between about 40° C. to 60° C. Stir for about 5–10 minutes to thoroughly mix and completely de-aerate the mass and add 100 parts of the unsaponifiable fraction of pollack liver oil. Continue the stirring for 30 to 60 minutes and filter. Elute the wet adsorbent 10 times with the combination consisting of 5 parts methanol and 95 parts of said petroleum ether. Remove solvent by vacuum distillation in the presence of an inert gas.

Taste, color and odor of the resulting vitamin concentrate are greatly improved.

Example III

Place into a vessel 400 parts of ethylene dichloride and 50 parts of calcium hydroxide. Mix thoroughly by stirring and heat to between about 50° C. to 60° C. for about 10 minutes to completely de-aerate the mixture and add 100 parts of the unsaponifiable fraction of dogfish liver oil (300,000 International units of vitamin A per gram). Continue the stirring and maintain at said temperature for about 30 to 60 minutes. Centrifuge and elute the wet adsorbent 10 times with the combination consisting of 95 parts of ethylene dichloride and 5 parts of isopropanol.

The resulting vitamin concentrate is greatly improved in taste, color and odor.

Example IV

Place in a vessel 50 parts of aluminum oxide and 400 parts of heptane. Mix thoroughly and completely de-aerate the mix by stirring for 5 to 10 minutes. Add 100 parts of the unsaponifiable fraction of pollack fish liver oil (838,000 International units of vitamin A per gram) and continue stirring for 30 to 60 minutes. Filter and wash the wet adsorbent with a combination of 5 parts methanol and 95 parts heptane. Remove solvent by vacuum distillation in the presence of nitrogen.

Color, taste and odor of vitaminiferous concentrate are greatly improved.

Instead of subjecting the unsaponifiable fraction of the fish oil to a single batch of adsorbent, it is within the purview of this invention to vary the specific procedure illustrated in the above examples in the manner hereinafter exemplified.

Example V

Weigh into a container 30 parts of aluminum oxide and add 400 parts of heptane. Stir for 5 to 10 minutes to completely mix and de-aerate the mass. Then add 100 parts of the unsaponifiable fraction from sword fish liver oil (900,000 International units of vitamin A per gram) and continue stirring for 30 minutes and filter. Weigh 20 parts of aluminum oxide in another container and add 20 parts of heptane. Stir for 5 to 10 minutes to completely mix and de-aerate. Add to the filtrate, continue stirring for about 30 minutes and filter. Combine the wet adsorbents and elute 10 times with a combination of 95 parts heptane and 5 parts ethanol. Remove the solvents from the second filtrate fraction and the elution fraction by distillation in an inert atmosphere of hydrogen.

Color, taste and odor of vitamin A concentrate obtained from the elution of the adsorbent is greatly improved.

Yield of concentrate from elution fraction _____ parts__ 40
Potency of concentrate from elution fraction, International units of vitamin A per gram _____ 1,800,000
Yield of concentrate from second filtrate fraction _____ parts__ 60
Potency of concentrate from second filtrate fraction, International units of vitamin A per gram _____ 300,000

Example VI

Weigh into a container 100 parts of the unsaponifiable fraction of pollack liver oil (838,000 International units of vitamin A per gram), add 900 parts of low boiling point ether (boiling point between about 40° C. to 60° C.) and mix thoroughly. Weigh into another container 50 parts of magnesium oxide and 50 parts of said ether, stir to thoroughly mix and de-aerate and add 60 parts of this mixture to the first mix. Continue stirring for 30 minutes and filter. Add the remaining 40 parts of the de-aerated mix to the filtrate, stir for 30 minutes and filter. Combine the adsorbent portions and elute 10 times with a combination consisting of 95 parts of said ether and 5 parts of methanol. Remove the solvents from the second filtrate fraction and elution fraction by vacuum distillation in the presence of nitrogen.

Color, taste and odor of vitamin A concentrate obtained from the elution of the adsorbent are greatly improved.

Yield of concentrate from elution fraction_____parts__ 25
Potency of concentrate from elution fraction, International units of vitamin A per gram_____ 1,600,000
Yield of concentrate from second filtrate fraction_____parts__ 75
Potency of concentrate from second filtrate fraction, International units of the vitamin A per gram_____ 575,000

Example VII

Weigh into a container 100 parts of the unsaponifiable fraction of dogfish liver oil (300,000 International units of vitamin A per gram), add 400 parts of ethylene dichloride and mix thoroughly. Weigh into another container 50 parts of ethylene dichloride and 50 parts of calcium hydroxide and heat to 50° C. and stir for 5 to 10 minutes to completely mix and de-aerate the mass. Add 60 parts of the second mix to the first mix, stir and heat to 50° C. for 30 minutes and then filter. Add the remaining 40 parts of the de-aerated mix to the filtrate, stir and heat to 50° C. for 30 minutes and filter. Combine the adsorbent and elute 10 times with a combination consisting of 5 parts isopropanol and 95 parts ethylene dichloride. Remove the solvents from the second filtrate fraction and from the elution fraction by vacuum distillation in the presence of an inert atmosphere of nitrogen gas or dry carbon dioxide.

Color, taste and odor of vitamin A concentrate obtained from the elution of the adsorbent are greatly improved.

Yield of concentrate from elution fraction_____parts__ 30
Potency of concentrate from elution fraction, International units of vitamin A per gram_____ 750,000
Yield of concentrate from second filtrate fraction_____parts__ 70
Potency of concentrate from second filtrate fraction, International units of vitamin A per gram_____ 100,000

Example VIII

Weigh into a container 100 parts of the unsaponifiable fraction of pollack fish liver oil (838,000 International units of vitamin A per gram), add 400 parts of heptane and mix thoroughly. Weigh into another container 50 parts of aluminum oxide and 50 parts of heptane, stir for 5 to 10 minutes to thoroughly mix and de-aerate. Add 60 parts of the second mix to the first mix, stir for 30 minutes and filter. To the filtrate add the remaining 40 parts of the de-aerated mix, stir for 30 minutes and filter. Combine the adsorbent portions and wash 5 times with a combination consisting of 5 parts methanol and 95 parts heptane. Remove the solvents from the second filtrate fraction and elution fraction by vacuum distillation in the presence of nitrogen gas.

Color, taste and odor of vitamin A concentrate obtained from the elution of the adsorbent are greatly improved.

Yield of concentrate from elution fraction_____parts__ 30
Potency of concentrate from elution fraction, International units of vitamin A per gram_____ 1,900,000
Yield of concentrate from second filtrate fraction_____parts__ 70
Potency of concentrate from second filtrate fraction, International units of vitamin A per gram_____ 370,000

Since certain changes may be made in carrying out the above process without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described my invention, what I claim as new and desire to secure by Letters Patent is:

1. A process of producing fat-soluble vitamin concentrates of high potency which comprises admixing the unsaponifiable fraction of a fat-soluble vitamin containing marine oil with a substantially completely deaerated mixture of a non-polar organic solvent and a substantially anhydrous alkaline reactive adsorbent, agitating the mass to accelerate adsorption of the vitamins, separating the adsorbent from the non-polar solvent, eluting the adsorbed vitamins by means of a mixture of a non-polar and a polar organic solvent and distilling off the solvent from the concentrated vitamin fraction.

2. A process of producing fat-soluble vitamin concentrates of high potency which comprises admixing the unsaponifiable fraction of a fat-soluble vitamin-containing marine oil with a substantially completely deaerated mixture of a hydrocarbon solvent and a substantially anhydrous alkaline reactive adsorbent, agitating the mass to accelerate adsorption of the vitamins, separating the adsorbent from the solvent, eluting the adsorbed vitamins by means of a mixture of a non-polar and a polar organic solvent and distilling off the solvent from the concentrated vitamin fraction.

3. A process of producing fat-soluble vitamin concentrates of high potency which comprises admixing the unsaponifiable fraction of a fat-soluble vitamin-containing marine oil with a substantially completely deaerated mixture of a hydrocarbon solvent and a substantially anhydrous alkaline reactive adsorbent, agitating the mass to accelerate adsorption of the vitamins, separating the adsorbent from the solvent, eluting the adsorbed vitamins by means of a mixture of a non-polar solvent selected from the aforementioned class and a monohydric aliphatic alcohol and distilling off the solvent from the concentrated vitamin fraction.

4. A process of producing fat-soluble vitamin concentrates of high potency which comprises admixing the unsaponifiable fraction of a fat-soluble vitamin-containing marine oil with a substantially completely deaerated mixture of a hydrocarbon solvent and a substantially anhydrous calcium hydroxide adsorbent, agitating the mass to accelerate adsorption of the vitamins, eluting the adsorbed vitamins by means of a mixture of a non-polar and a polar organic solvent and distilling off the solvent from the concentrated vitamin fraction.

5. The process of claim 4 wherein the ratio of non-polar to polar solvent in the eluting solvent mixture is at least nine to one by weight.

6. A process of producing fat-soluble vitamin concentrates of high potency which comprises admixing the unsaponifiable fraction of a fat-soluble vitamin-containing marine oil with a substantially completely deaerated mixture of a halogenated hydrocarbon solvent and a substantially anhydrous alkaline reactive adsorbent, agitating the mass to accelerate adsorption of the vitamins, separating the adsorbent from the solvent, eluting the adsorbed vitamins by means of a mixture of a non-polar and a polar organic solvent and distilling off the solvent from the concentrated vitamin fraction.

7. A process of producing fat-soluble vitamin concentrates of high potency which comprises admixing the unsaponifiable fraction of a fat-soluble vitamin-containing marine oil with a substantially completely deaerated mixture of a halogenated hydrocarbon solvent and a substantially anhydrous alkaline reactive adsorbent, agitating the mass to accelerate adsorption of the vitamins, separating the adsorbent from the solvent, eluting the adsorbed vitamins by means of a mixture of a non-polar solvent selected from the aforementioned class and a monohydric aliphatic alcohol and distilling off the solvent from the concentrated vitamin fraction.

8. A process of producing fat-soluble vitamin concentrates of high potency which comprises admixing the unsaponifiable fraction of a fat-soluble vitamin-containing marine oil with a substantially completely deaerated mixture of a halogenated hydrocarbon solvent and a substantially anhydrous calcium hydroxide adsorbent, agitating the mass to accelerate adsorption of the vitamins, eluting the adsorbed vitamins by means of a mixture of a non-polar and a polar organic solvent and distilling off the solvent from the concentrated vitamin fraction.

9. The process of claim 8 wherein the ratio of non-polar to polar solvent in the eluting solvent mixture is at least nine to one by weight.

10. A process of producing fat-soluble vitamin concentrates of high potency which comprises admixing the unsaponifiable fraction of a fat-soluble vitamin-containing marine oil with a substantially completely deaerated mixture of a non-polar organic solvent and a substantially anhydrous alkaline earth oxide adsorbent, agitating the mass to accelerate adsorption of the vitamins, separating the adsorbent from the non-polar solvent, eluting the adsorbed vitamins by means of a mixture of a non-polar and a polar organic solvent and distilling off the solvent from the concentrated vitamin fraction.

11. A process of producing fat-soluble vitamin concentrates of high potency which comprises admixing the unsaponifiable fraction of a fat-soluble vitamin-containing marine oil with a substantially completely deaerated mixture of a non-polar organic solvent and a substantially anhydrous alkaline earth hydroxide adsorbent, agitating the mass to accelerate adsorption of the vitamins, separating the adsorbent from the non-polar solvent, eluting the adsorbed vitamins by means of a mixture of a non-polar and a polar organic solvent and distilling off the solvent from the concentrated vitamin fraction.

12. A process of producing fat-soluble vitamin concentrates of high potency which comprises admixing the unsaponifiable fraction of a fat-soluble vitamin-containing marine oil with a substantially completely deaerated mixture of a non-polar organic solvent and a substantially anhydrous barium hydroxide adsorbent, agitating the mass to accelerate adsorption of the vitamins, separating the adsorbent from the non-polar solvent, eluting the adsorbed vitamins by means of a mixture of a non-polar and a polar organic solvent and distilling off the solvent from the concentrated vitamin fraction.

13. A process of producing fat-soluble vitamin concentrates of high potency which comprises admixing the unsaponifiable fraction of a fat-soluble vitamin-containing marine oil with a substantially completely deaerated mixture of a non-polar organic solvent and a substantially anhydrous calcium oxide adsorbent, agitating the mass to accelerate adsorption of the vitamins, separating the adsorbent from the non-polar solvent, eluting the adsorbed vitamins by means of a mixture of a non-polar and a polar organic solvent and distilling off the solvent from the concentrated vitamin fraction.

LORAN O. BUXTON.